(12) United States Patent
Olsen

(10) Patent No.: US 10,038,566 B1
(45) Date of Patent: Jul. 31, 2018

(54) SYSTEMS AND METHODS FOR MULTICAST MESSAGE ROUTING

(71) Applicant: Ivanti, Inc., South Jordan, UT (US)

(72) Inventor: Gregory P. Olsen, Lindon, UT (US)

(73) Assignee: Ivanti, Inc., South Jordan, UT (US)

( * ) Notice: Subject to any disclaimer, the term of this patent is extended or adjusted under 35 U.S.C. 154(b) by 131 days.

(21) Appl. No.: 14/061,015

(22) Filed: Oct. 23, 2013

(51) Int. Cl.
*H04L 12/18* (2006.01)

(52) U.S. Cl.
CPC .................... *H04L 12/18* (2013.01)

(58) Field of Classification Search
CPC ........................................... H04L 12/18
See application file for complete search history.

(56) References Cited

U.S. PATENT DOCUMENTS

| | | | |
|---|---|---|---|
| 7,046,666 B1 * | 5/2006 | Bollay | H04L 29/12009 370/392 |
| 9,137,780 B1 | 9/2015 | Olsen et al. | |
| 2003/0037331 A1 | 2/2003 | Lee | |
| 2004/0107242 A1 | 6/2004 | Vert et al. | |
| 2006/0018333 A1 * | 1/2006 | Windisch | H04L 12/1877 370/432 |
| 2006/0072572 A1 * | 4/2006 | Ikeda | H04L 12/18 370/390 |
| 2006/0265709 A1 | 11/2006 | Meaney | |
| 2007/0116014 A1 * | 5/2007 | Shuen | H04L 12/2856 370/395.53 |
| 2007/0118614 A1 * | 5/2007 | Bertin | H04L 29/06 709/219 |
| 2007/0140213 A1 * | 6/2007 | Milligan | H04L 12/1836 370/351 |
| 2007/0156898 A1 * | 7/2007 | Appleby | H04L 63/10 709/225 |
| 2007/0177513 A1 * | 8/2007 | Kuokkanen | H04L 12/2697 370/241 |
| 2008/0247396 A1 * | 10/2008 | Hazard | H04L 12/66 370/392 |
| 2009/0070579 A1 * | 3/2009 | Murakami | H04L 63/0815 713/155 |
| 2010/0088425 A1 * | 4/2010 | Hooda | H04W 4/001 709/231 |
| 2011/0019673 A1 * | 1/2011 | Fernandez Gutierrez | H04L 12/185 370/390 |
| 2011/0164508 A1 * | 7/2011 | Arai | H04L 45/00 370/245 |

OTHER PUBLICATIONS

Office Action for U.S. Appl. No. 14/583,531, dated Sep. 11, 2017, 11 pages.

* cited by examiner

*Primary Examiner* — Brandon M Renner
*Assistant Examiner* — Jay L Vogel

(57) ABSTRACT

A computing device configured for multicast message routing is described. The computing device includes a processor and instructions in memory. The computing device receives a multicast request message on a receiving network interface. The receiving network interface is one of multiple network interfaces. The computing device determines which network interface is the receiving network interface based on a network interface list. The computing device sends a multicast reply message on the receiving network interface based on the network interface list.

17 Claims, 10 Drawing Sheets

US 10,038,566 B1

SYSTEMS AND METHODS FOR MULTICAST MESSAGE ROUTING

TECHNICAL FIELD

The present disclosure relates generally to computers and computer-related technology. More specifically, the present disclosure relates to multicast message routing.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. A computer network may have hundreds or even thousands of computing devices connected to the network.

A computing device may be instructed to download a file. The computing device may send a multicast request message seeking peers on the network that may transmit the file. Another computing device may receive the multicast request message. However, the receiving computing device may have multiple network interfaces that may be connected to different networks or subnets.

As shown from the above discussion, there is a need for systems and methods that will improve the ability to determine which network interface a multicast reply message should be sent out of. Improved systems and methods may enable more efficient distribution of data to computing devices on a network. That is, the improved systems and methods disclosed herein may increase multicast efficiency by improving multicast message routing for computing devices with multiple network interfaces.

DETAILED DESCRIPTION

Figure 1:
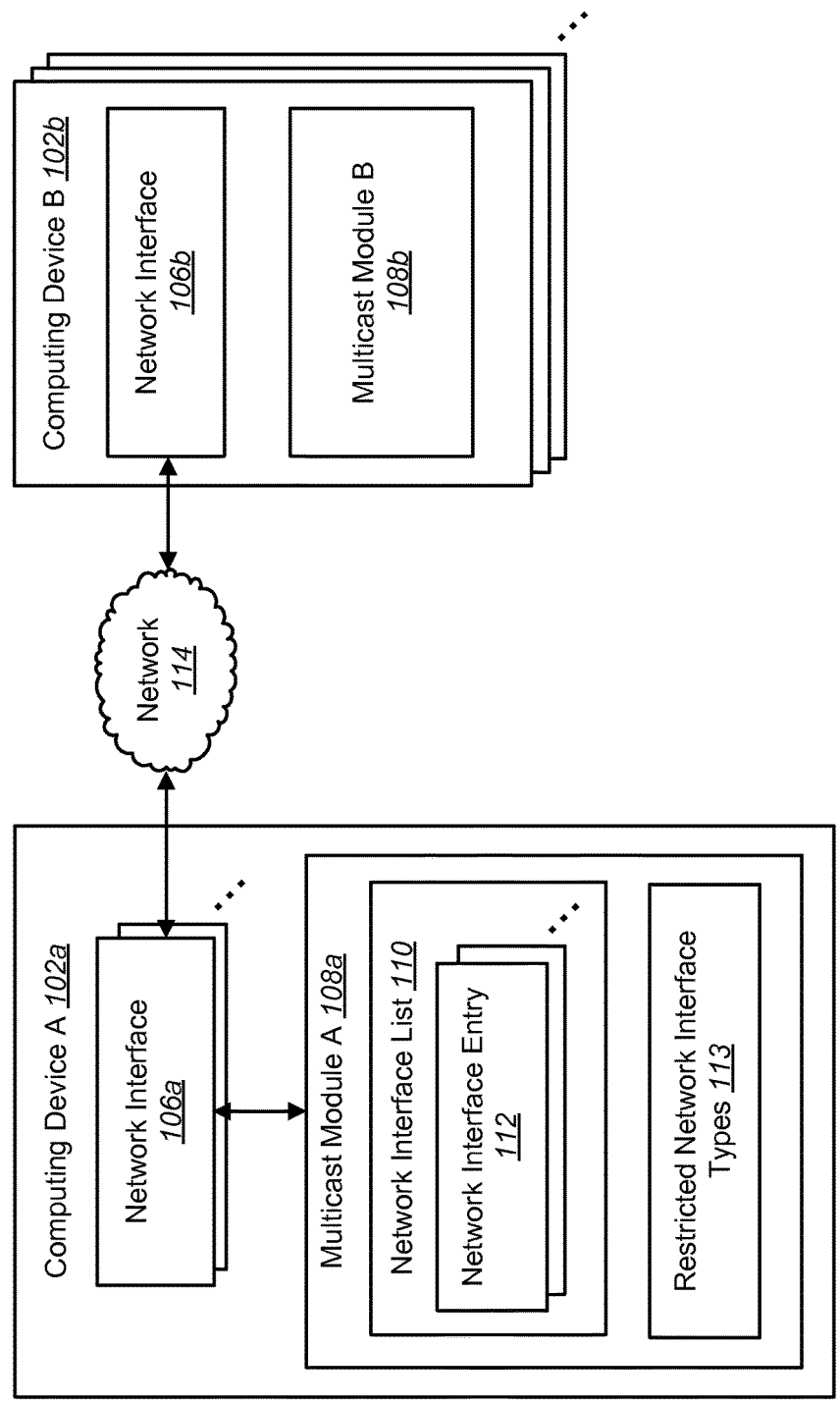
FIG. 1 is a block diagram illustrating a computing device in which systems and methods for multicast message routing may be implemented.

There is often a need to distribute data to computing devices in a network. For example, a computing device may be instructed to download a file from a peer. As used herein, the term "peers" refers to computing devices (e.g., nodes) that are connected to a network and can exchange information (e.g., data, files, messages, etc.) directly with each other. In one configuration, a computing device may attempt to download a file from a peer through multicasting. Multicasting refers to a communication technique where a single computing device may send the same data to many (or even all) computing devices on a network.

In some configurations, multicast and peer download functionality may utilize two-way communication on a multicast channel. For example, when a computing device is instructed to download a file from a peer, the computing device may send a multicast request message on the multicast channel and any peers on that subnet that have the file may reply on the multicast channel by sending a multicast reply message. It should be noted that the reply is also sent as a multicast message (rather than point-to-point) so that all peers will see each other's replies and can decide if they still need to reply based on the replies of other peers.

Problems may occur with computing devices that have more than one network interface. For example, a computing device may have more than one network interface controller (NIC) or a NIC may be configured with multiple internet protocol (IP) addresses. In current approaches, software listens on a single socket for multicast messages. This socket is configured to receive multicast messages from all of the active network interfaces. However, using the current approaches (relying on system defaults), there is no way to control which of the multiple network interfaces a multicast message is sent out from. An operating system (OS) may arbitrarily select a network interface to send out the multicast reply message. Furthermore, there is no information in the multicast packet (e.g., the multicast request message) that indicates which network interface received the message. All the computing device may know about the received multicast packet is the IP address of the peer that sent the message. Mechanisms exist to bind a socket to a particular network interface, but it may be difficult to determine which particular network interface the socket should be bound to. In other words, the difficulty comes in determining which network interface is the receiving network interface.

Computing devices may have different network interface types. For example, a computing device may have wireless and wired interfaces. Computing devices might even have a virtual private network (VPN) interface connection. For example, when a computing device is taken from a user's office to the user's home or when the user is traveling, the computing device may establish a VPN interface connection to the office network. However, certain network interface types (e.g., wireless and VPN interfaces) may provide poor performance for peer download functionality.

In an effort to remedy these difficulties, a computing device may utilize a network interface list to determine which network interface a multicast request message comes in on and ensure that any replies to that request are sent out on that network interface. Furthermore, a computing device may utilize the network interface list to determine whether a network interface should be disabled from participating in multicast and peer download operations based on the network interface type. Additionally, a computing device may utilize a network interface list to send a multicast request message on each interface to maximize chances of finding a peer.

A computing device that is configured for multicast message routing is described. The computing device includes a processor and instructions in memory. The computing device receives a multicast request message on a receiving network interface. The receiving network interface is one of multiple network interfaces. The computing device also determines which network interface is the receiving network interface based on a network interface list. The computing device further sends a multicast reply message on the receiving network interface based on the network interface list.

The network interface list may include a network interface entry for each of the network interfaces. Each network interface entry may include a socket that is bound to the network interface associated with the network interface entry. The computing device may send the multicast reply message using the socket that is bound to the receiving network interface.

Each network interface entry may include an IP address and a subnet mask corresponding to a network interface. The computing device may determine which network interface is the receiving network interface based on the IP address and the subnet mask of a network interface entry and a source IP address associated with the multicast request message.

Each network interface entry may include a network interface type. The network interface type may be one of a wired interface, a wireless interface or a virtual private network (VPN) interface. The computing device may withhold sending the multicast reply message when the network interface type of the receiving network interface is a wireless interface or a VPN interface.

The computing device may also send a multicast request message on each of the multiple network interfaces included in the network interface list. Each network interface may be connected to a different subnet.

A method for multicast message routing by a computing device is also described. The method includes receiving a multicast request message on a receiving network interface. The receiving network interface is one of multiple network interfaces. The method also includes determining which network interface is the receiving network interface based on a network interface list. The method further includes sending a multicast reply message on the receiving network interface based on the network interface list.

A non-transitory tangible computer-readable medium for multicast message routing on a computing device is also described. The computer-readable medium includes executable instructions. The instructions include receiving a multicast request message on a receiving network interface. The receiving network interface is one of multiple network interfaces. The instructions also include determining which network interface is the receiving network interface based on a network interface list. The instructions further include sending a multicast reply message on the receiving network interface based on the network interface list.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations of the present systems and methods, as represented in the Figures, is not intended to limit the scope of these systems and methods, as claimed, but is merely representative of the configurations of the systems and methods.

FIG. 1 is a block diagram illustrating a computing device A 102a in which systems and methods for multicast message routing may be implemented. The computing device A 102a is connected to a network 114. The network 114 may be a computer network such as a Local Area Network (LAN), Wide Area Network (WAN) or the Internet. One or more additional computing devices B 102b may also be connected to the network 114.

The computing devices 102 may be delineated, for example, according to Local Area Networks (LANs) or subnets of a larger network. As used herein a "subnet" is a smaller network created by dividing a larger network 114. In one configuration, the network 114 may be a transmission control protocol/internet protocol (TCP/IP) network divided into subnets of equal size. The additional computing devices B 102b may be located on the same subnet, or the additional computing devices B 102b may be located in different subnets.

The computing devices 102 may connect to the network 114 via one or more network interfaces 106a-b. A network interface 106 is a software and/or hardware system that enables computing devices 102 to communicate with each other on the network 114. A network interface 106 may be one of different network interface types. For example, a network interface 106 may be a wired network interface or a wireless network interface. Additionally, a network interface 106 may be a virtual private network (VPN) interface.

A network interface 106 may include a socket (e.g., network socket). A socket may be an identifier for a particular service on a particular node (e.g., computing device 102). A socket may be characterized by a socket address that includes an internet protocol (IP) address and a port number. The IP address may be associated with a particular network interface 106. The port number enables IP packets to be sent to a particular process (e.g., application) on a computing device 102. In some configurations, the computing device 102 may use a socket application programming interface (API) to create and use a socket. One example of a socket API is the Berkeley sockets API. Another example of a socket API for a computing device 102 that is running a Windows operating system (OS) is Windows Sockets (Winsock).

Computing device A 102a includes multiple network interfaces 106. A computing device 102 that has multiple network interfaces 106 may be referred to as a multihomed computing device 102. In one configuration, computing device A 102a has multiple network interface controllers (NICs). Each of the multiple NICs may be a separate network interface 106 with one or more different IP addresses. In another configuration, computing device A 102a may have a single physical upstream link with multiple IP addresses.

Computing device A 102a may include a multicast module A 108a. Furthermore, in the example illustrated in FIG. 1, each of the computing devices B 102b may include a multicast module B 108b to implement multicasting. The multicast module 108 may perform multicast operations. As used herein, "multicast" or "multicasting" refers to the simultaneous transmission of data to multiple recipients (e.g., computing devices 102) also listening on the multicast channel. If a recipient is listening on the multicast channel, then the recipient may receive the multicast data even if it was not intended for them. The recipient may then determine how to process the received data.

In some implementations, each computing device 102 in a particular subnet may join a multicast group. In some configurations, a multicast group may be defined by a multicast IP address and a port number. A range of IP addresses may be reserved to be used only for multicast. A port number may be selected. The combination of the IP address and port number together define a multicast channel or group. A computing device 102 utilizing a multicast service may join a multicast group on one or more network interfaces 106. The one or more network interfaces 106 may be instructed to receive multicast messages for the specific multicast address and port number that define the multicast group. The same multicast group may be joined on different subnets. A multihomed computing device 102 (such as computing device A 102a), may join a multicast group associated with each of the subnets to which it is connected. Therefore, a multihomed computing device 102 may send and receive multicast messages on one or more network interfaces 106. A multicast message may include the source IP address of the computing device 102 that sends the multicast message.

Multicast module A 108a may listen for multicast messages on a single multicast listen socket. In one configuration, the multicast listen socket is configured to receive multicast messages from all active network interfaces 106a. The multicast module A 108a may also select a network interface 106a on which to send a multicast message. In one configuration, the multicast module A 108a may receive a multicast request message on one of the multiple network interfaces 106a. The network interface that receives the multicast request message may be referred to as the receiving network interface 106a. The multicast request message may be received from a computing device B 102b requesting the transfer of a file.

Multicast module A 108a may include a network interface list 110. Multicast module A 108a may use the network interface list 110 to determine which network interface 106a is the receiving network interface 106a. The network interface list 110 may be a table of structures that represent all active network interfaces 106a capable of sending or receiving multicast messages. In one configuration, the network interface list 110 may include a network interface entry 112 for each of the network interfaces 106a. A network interface entry 112 may include information corresponding to a particular network interface 106a. A network interface entry 112 may contain a socket (e.g., windows socket) that is bound to the network interface 106a associated with the network interface entry 112. A network interface entry 112 may also contain the IP address and subnet mask of the network interface 106a associated with the network interface entry 112. A network interface entry 112 may further contain a network interface type of the associated network interface 106a. For example, a network interface type may be a wired interface, a wireless interface or a virtual private network (VPN) interface. The network interface list 110 is discussed in more detail in connection with FIG. 5.

The multicast module A 108a may determine which network interface 106a is the receiving network interface 106a based on the IP address and the subnet mask of a network interface entry 112 and the source IP address associated with the multicast request message. In one configuration, the multicast module A 108a may determine whether the IP address of a network interface entry 112 and the source IP address associated with the multicast request message have the same network (or subnet) address using the subnet mask of a network interface entry 112. If the network portion of a network interface 106a IP address is the same as the network portion of the source IP address, then the two IP addresses belong to the same subnet. If the network portions of the IP addresses are different, then the IP addresses do not belong to the same subnet. In other words, if the network portion of the local IP address (stored in the network interface list 110) is different than the network portion of the source IP address, then the multicast request message was not received on the network interface 106a associated with that local IP address. If the network portions of the local IP address and the source IP address match, then the multicast request message was received on the subnet associated with the network interface 106a associated with that local IP address.

The multicast module A 108a may send a multicast reply message on the receiving network interface 106a based on the network interface list 110. The multicast reply message may indicate that the computing device A 102a has the file requested by the multicast request message. The multicast reply message may be sent to each computing device B 102b in the subnet multicast group. As described above, each network interface entry 112 may indicate a socket that is bound to the network interface 106a associated with the network interface entry 112. As used herein, a socket that is bound to a network interface 106 refers to a socket (e.g., handle) that is configured such that when a multicast message is sent using the socket, the multicast message will go out the corresponding network interface 106. The multicast module A 108a may obtain the socket that is bound to the receiving network interface 106a from the network interface list 110 and may send the multicast reply message using the bound socket.

In order to efficiently transfer a requested file, the computing device A 102a may enable and disable the participation of a network interface 106 on a multicast channel based on the network interface type. In one configuration, multicast module A 108a may determine whether the receiving network interface 106a is a type of network interface 106 that may be efficiently used to transfer the requested file. Downloading from a peer on a VPN or wireless connection may be expensive. A VPN connection will look like it is on a local subnet, but it may be very far away. For example, a peer on a VPN connection may really be halfway around the world. Due to the distance, a VPN connection may operate on network connections that cost a lot of money, or the VPN may be very slow. A wireless connection may be inefficient due to radio resource limitations. Therefore, a lot multicast traffic might keep users from getting their work done.

The multicast module A 108a may detect if a network interface 106a is a VPN or wireless network interface 106a and may disable multicast functionality on that network interface 106a. In other words, the multicast module A 108a may be configured to not reply to peer file requests if the request came in on a VPN or wireless network interface 106.

Multicast module A 108a may obtain the network interface type of the receiving network interface 106a from the network interface list 110 to determine whether the receiving network interface 106a is one of a restricted interface type 113. Multicast module A 108a may include one or more network interface types in a list of restricted network interface types 113. For example, one of the restricted network interface types 113 may be a wireless network interface. Another restricted network interface type 113 may be a VPN interface.

In one configuration, if the network interface type of the receiving network interface 106a indicates that the receiving network interface 106a is a wired network interface 106a, then multicast module A 108a may send the multicast reply message on the receiving network interface 106a. If the network interface type of the receiving network interface 106a indicates that the receiving network interface 106a is a wireless or VPN interface, then multicast module A 108a may not send the multicast reply message. In this way, a network interface 106a that is a wireless or VPN interface may be restricted from participating in a file transfer. It should be noted that the restricted network interface types 113 may be configured to include additional network interface types not mentioned in this discussion. Furthermore, in some scenarios, the multicast module A 108a may not have any restricted network interface types 113. In other words, multicast module A 108a may be configured to permit any network interface type to participate in the transfer of a requested file.

In yet another configuration, the multicast module A 108a may send a multicast request message on each of the multiple network interfaces included in the network interface list 110. In this configuration, computing device A 102a may receive an instruction to download a file from a peer. Multicast module A 108a may determine the sockets for each of the network interfaces 106a from the network interface list 110. The multicast module A 108a may then send the multicast request message using the sockets of each network interface 106a. Therefore, when computing device A 102a is looking for a file, multicast module A 108a may send the multicast request message out on all of its network interfaces 106a so that computing devices B 102b on all the subnets that the computing device A 102a is connected to will see the request. By sending the multicast request message out on all of its network interfaces 106a, computing device A 102a may maximize the chances of finding a peer that has the requested file.

Figure 2:
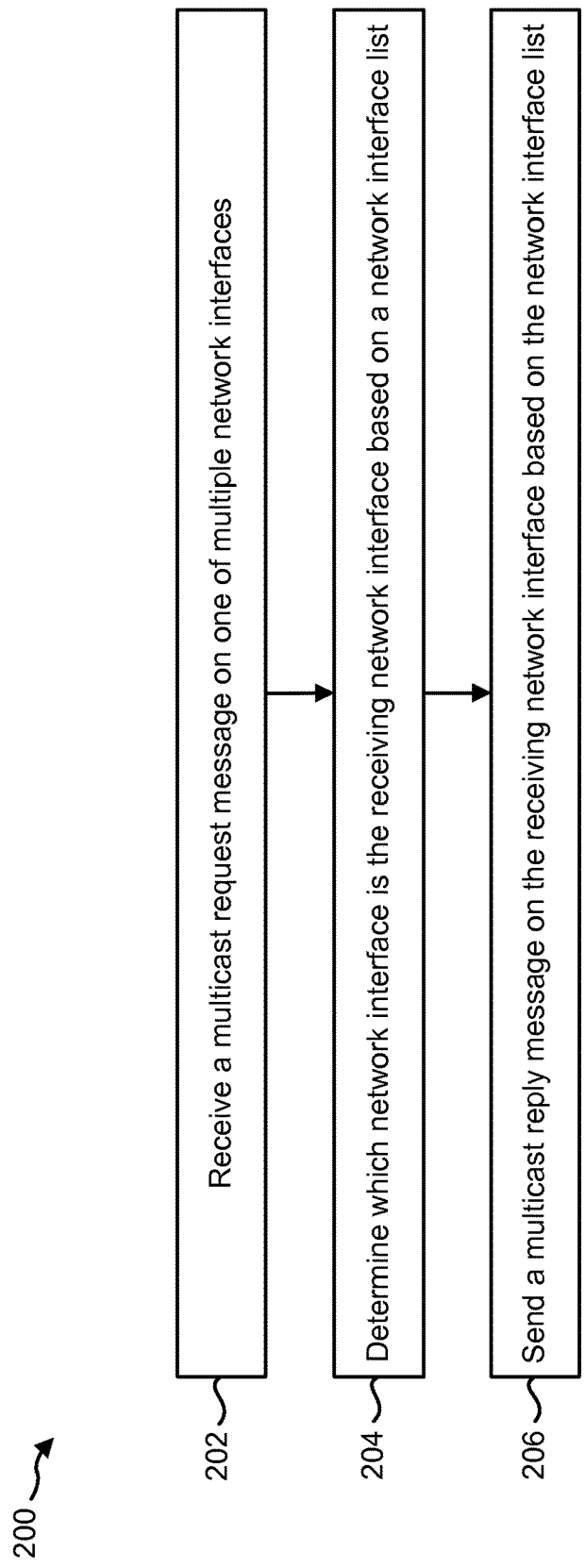
FIG. 2 is a flow diagram illustrating one configuration of a method for multicast message routing.

FIG. 2 is a flow diagram illustrating one configuration of a method 200 for multicast message routing. A computing device 102 may receive 202 a multicast request message on a receiving network interface 106. In some configurations, the receiving network interface 106 is one of multiple network interfaces 106. The multicast request message may request the transfer of a file stored on the computing device 102.

The computing device 102 may determine 204 which network interface 106 is the receiving network interface 106 based on a network interface list 110. The network interface list 110 may be a list of all active network interfaces 106 capable of sending or receiving multicast messages. In one configuration, the network interface list 110 may include a network interface entry 112 for each of the network interfaces 106. A network interface entry 112 may indicate a socket that is bound to the network interface 106 associated with the network interface entry 112. A network interface entry 112 may also indicate the IP address and subnet mask of the corresponding network interface 106. A network interface entry 112 may further indicate a network interface type (e.g., wired, wireless, VPN, etc.) of the corresponding network interface 106.

The computing device 102 may determine 204 which network interface 106 is the receiving network interface 106 based on the IP address and the subnet mask of a network interface entry 112 and the source IP address associated with the multicast request message. For example, the computing device 102 may determine whether the IP address of a network interface entry 112 and the source IP address associated with the multicast request message have the same network (or subnet) address using the subnet mask of a network interface entry 112. If the network portions of the IP addresses are different, then the IP addresses do not belong to the same subnet. If the network portion of a network interface 106a IP address is the same as the network portion of the source IP address, then the two IP addresses belong to the same subnet and the network interface 106a is determined 204 to be the receiving network interface. Operations that may be used to determine 204 the receiving network interface 106 are discussed in more detail in connection with FIG. 6.

The computing device 102 may send 206 a multicast reply message on the receiving network interface 106 based on the network interface list 110. The multicast reply message may indicate that the computing device 102 has the file requested by the multicast request message. The computing device 102 may send 206 the multicast reply message to each additional computing device 102 in the subnet multicast group. The computing device 102 may obtain the socket that is bound to the receiving network interface 106 from the network interface list 110 and may send 206 the multicast reply message using the bound socket.

The computing device 102 may enable and disable the participation of a network interface on a multicast channel based on the network interface type. In one configuration, the computing device 102 may determine whether the receiving network interface 106 is a type of network interface 106 that may be efficiently used to transfer the requested file. The computing device 102 may obtain the network interface type of a receiving network interface 106 from the network interface list 110 to determine whether the receiving network interface 106 is a restricted interface type 113. For example, a restricted network interface type 113 may be a VPN interface and/or a wireless interface.

If the network interface list 110 indicates that the network interface type of the receiving network interface 106 is a wired network interface 106, then the computing device 102 may send 206 the multicast reply message on the receiving network interface 106. However, if the network interface type of the receiving network interface 106 is a wireless or VPN interface or other restricted network interface type 113, then the computing device 102 may withhold (e.g., not send) the multicast reply message.

Figure 3:
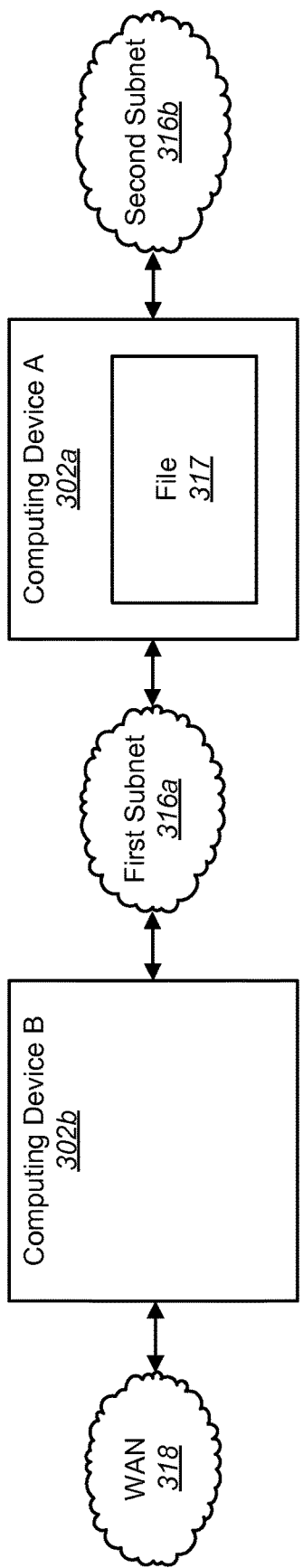
FIG. 3 is a block diagram illustrating one example of multicast message routing between a computing device A and computing device B.

FIG. 3 is a block diagram illustrating one example of multicast message routing between a computing device A 302a and computing device B 302b. This example illustrates problems associated with known approaches to multicast message routing. In this example, computing device A 302a is multihomed (e.g., has multiple network interfaces 106). Computing device A 302a has network connections to a first subnet 316a and a second subnet 316b. Computing device B 302b is connected to the first subnet 316a, but not the second subnet 316b.

Computing device B 302b sends out a multicast request message for a certain file 317 to peers on the first subnet 316a. Computing device A 302a receives the multicast request message and has the file 317 (stored in a cache directory, for instance). When no other computing devices 302 reply to the multicast request message, computing device A 302a decides to send a multicast reply message indicating that it has the file 317.

Computing device A 302a may send the multicast reply message on either the first subnet 316a or the second subnet 316b. If the network interface 106 on which the computing device A 302a selects to send the multicast reply message is connected to the second subnet 316b, then computing device B 302b will not see the multicast reply message. Computing device B 302b may then fall back to the source of the file 317 and download the file 317 over the expensive WAN 318 link instead of downloading the file 317 from a peer.

Figure 4:
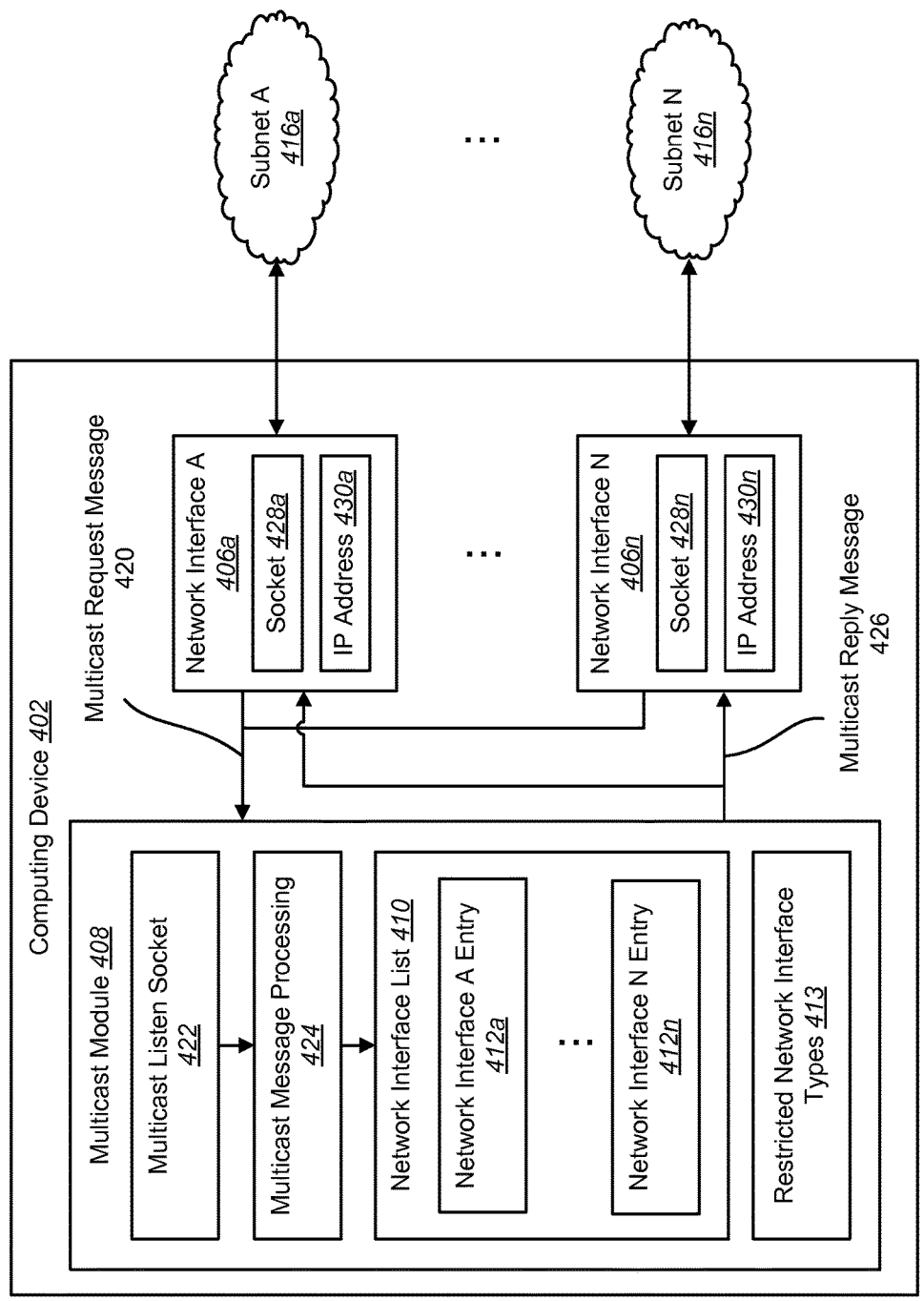
FIG. 4 is a block diagram illustrating a more detailed configuration of a computing device in which systems and methods for multicast message routing may be implemented.

FIG. 4 is a block diagram illustrating a more detailed configuration of a computing device 402 in which systems and methods for multicast message routing may be implemented. The computing device 402 may include two or more network interfaces 406a-n. The network interfaces 406a-n may be software and/or hardware systems that may enable the computing device 402 to communicate with other computing devices 402 on a network 114. A network interface 406 may be one of different network interface types. For example, a network interface 406 may be a wired interface, a wireless interface or VPN interface.

Each network interface 406 may be connected to a subnet 416. A subnet 416 may be a subdivision of a larger network 114. In one configuration, the subnets 416a-n may be part of the same network 114. In another configuration, two or more subnets 416a-n may be part of different networks 114.

In one configuration, the network interfaces 406a-n may be connected to separate subnets 416a-n. For example, network interface A 406a may be connected to subnet A 416a and network interface N 406n may be connected to subnet N 416n. In another configuration, two or more network interfaces 406 may be connected to the same subnet 416.

Each network interface 406a-n may be associated with a socket 428 (e.g., network socket). An application may create a socket 428 bound to a network interface 406. The socket 428 may be used as a handle to use the network interface 406 to perform networking related tasks. In one configuration, the socket 428 may be a socket for user datagram protocol (UDP) packets that is configured to send multicast messages and bound to a specific network interface 406. Therefore, when a multicast packet is sent using a particular socket 428, the network interface 406 that the multicast packet will go out of is also known. A network interface may also be associated with an IP address 430. For example, network interface A 406a may have one socket 428a and an IP address 430a while network interface N 406n may have another socket 428n and another IP address 430n.

The computing device 402 may include a multicast module 408. The multicast module 408 may perform multicast operations. In some configurations, the multicast operations may include sending multicast data to other computing devices 402 connected to one of the subnets 416a-n. The multicast operations may also include receiving multicast data from one or more other computing devices 402 connected to one of the subnets 416a-n.

The multicast module 408 may include a network interface list 410, a multicast listen socket 422 and a multicast message processing module 424. The multicast module 408 may add a network interface entry 412 to the network interface list 410 for each of the multiple network interfaces 406a-n. For example, the multicast module 408 may add a network interface A entry 412a corresponding to network interface A 406a. The multicast module 408 may continue to add network interface entries 412 for each network interface 406 through a network interface N entry 412n corresponding to network interface N 406n. The multicast module 408 may periodically update the network interface list 410 to ensure that the network interface entries 412 are current. For example, the multicast module 408 may update the network interface list 410 based on an event (e.g., when a network interface 406 is activated or deactivated). The multicast module 408 may also update the network interface list 410 based on a schedule (e.g., every minute, every five minutes, every ten minutes, etc.).

A network interface entry 412 may include information about the corresponding network interface 406. In one configuration, a network interface entry 412 may indicate a socket 428 that is bound to a network interface 406. A network interface entry 412 may also indicate the IP address 430 and subnet mask of the corresponding network interface 406. A network interface entry 412 may further indicate a network interface type (e.g., wired, wireless, VPN, etc.) of the corresponding network interface 406. The network interface list 410 and network interface entries 412 are discussed in more detail in connection with FIG. 5.

The multicast listen socket 422 may listen for multicast messages. In one configuration, the multicast listen socket 422 is configured to receive multicast messages from all network interfaces 406a-n. One of the network interfaces 406 may receive a multicast request message 420. The multicast request message 420 may be received from a computing device 402 requesting the transfer of a file 317. The multicast request message 420 may include the source IP address 428 of the computing device 402 that sent the multicast request message 420. The network interface 406 that receives the multicast request message 420 may be referred to as the receiving network interface 406. However, because the multicast listen socket 422 may receive multicast messages from all network interfaces 406a-n, the multicast messages received on the receiving network interface 406 are indistinguishable from multicast messages received on the other network interfaces 406.

Upon receiving the multicast request message 420, the multicast message processing module 424 may generate a multicast reply message 426. If the computing device 402 has the file 317 requested by the multicast request message 420 and no other computing devices 402 have responded, the multicast message processing module 424 may generate a multicast reply message 426. The multicast reply message 426 may indicate that the computing device 402 has the requested file 317.

The multicast module 408 may determine which network interface 406 is the receiving network interface 406 based on the network interface list 410. The multicast module 408 may obtain a source IP address associated with the multicast request message 420. The multicast module 408 may then compare the source IP address with the IP address 430 and the subnet mask of the network interface entries 412a-n. In one configuration, the multicast module 408 may determine whether the IP address 430 of a network interface entry 412 and the source IP address associated with the multicast request message 420 have the same network (or subnet) address using the subnet mask of a network interface entry 412 (stored in the network interface list 410). This may be accomplished as described below in connection with FIG. 6. If the network portion of an IP address 430 associated with a network interface 406 is different than the network portion of the source IP address, then the two IP addresses do not belong to the same subnet 416. If the network portion of an IP address 430 associated with a network interface 406 is the same as the network portion of the source IP address, then the two IP addresses belong to the same subnet 416 and the network interface 406 is determined to be the receiving network interface 406.

The multicast module 408 may determine whether the receiving network interface 406 is a restricted network interface type 413 based on the network interface list 410. The multicast module 408 may obtain the network interface type of the receiving network interface 406 from the network interface list 410. In one configuration, the restricted network interface types 413 may include wireless or VPN interfaces. Therefore, if the network interface type of the receiving network interface 406 is a wired network interface 406, the multicast module 408 may send the multicast reply message 426 on the receiving network interface 406. However, if the network interface type of the receiving network interface 406 is a wireless or VPN interface, then the multicast module 408 may not send the multicast reply message 426.

The multicast module 408 may send the multicast reply message 426 to each computing device 402 in a multicast group of the subnet 416 associated with the receiving network interface 406. As described above, each network interface entry 412 may indicate a socket 428 that is bound to the network interface 406 associated with the network interface entry 412. The multicast module 408 may obtain the socket 428 that is bound to the receiving network interface 406 from the network interface list 410. The multicast module 408 may send the multicast reply message 426 using the bound socket 428. For example, a "sendto" command may be issued using the socket 428 included in the network interface entry 412 associated with the receiving network interface 406.

In another scenario, the multicast module 408 may send a multicast request message 420 on each of the multiple network interfaces 406*a-n* included in the network interface list 410. For example, the computing device 402 may be instructed to download a file 317. The multicast module 408 may determine the sockets 428 for each of the network interfaces 406*a-n* from the network interface list 410. The multicast module 408 may then send the multicast request message 420 using the sockets 428 of each network interface 406. Therefore, when the computing device 402 is looking for a file 317, the multicast module 408 may send the multicast request message 420 out on all network interfaces 406 so that the other computing devices 402 on all the subnets 416 that the computing device 402 is connected to will see the request. By sending the multicast request message 420 out on each of the network interfaces 406*a-n*, the computing device 402 may maximize the chances of finding a peer that has the requested file 317.

Figure 5:
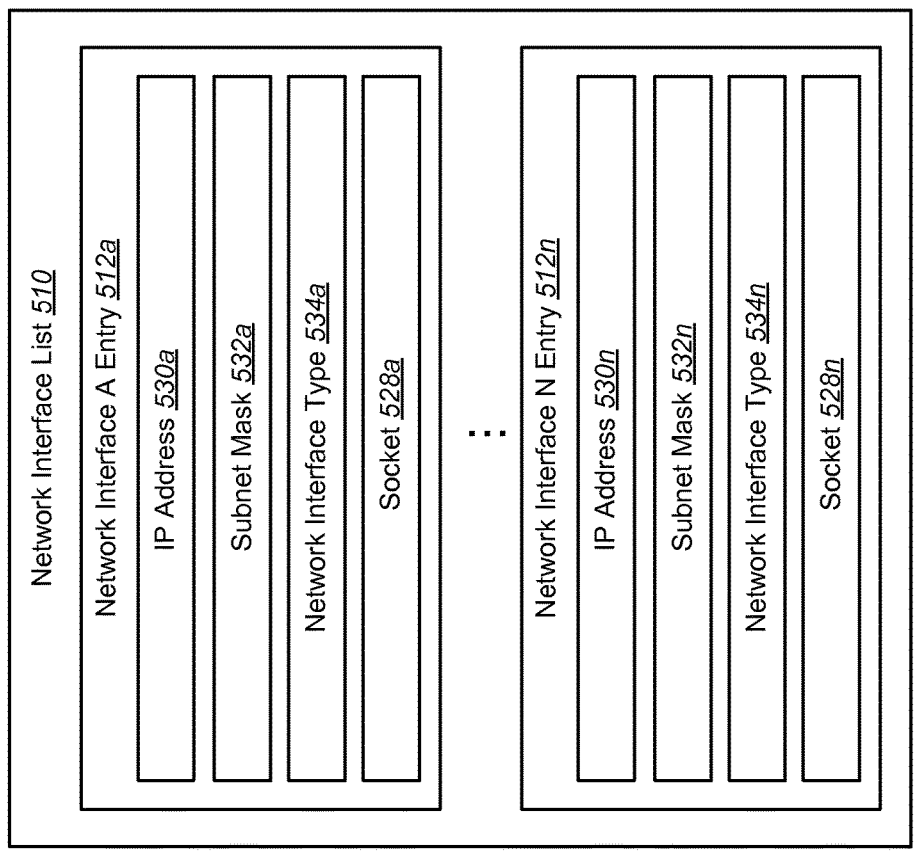
FIG. 5 is a block diagram that illustrates one configuration of a network interface list.

FIG. 5 is a block diagram that illustrates one configuration of a network interface list 510. The network interface list 510 may be similar to the network interface list 110 described above in connection with FIG. 1. The network interface list 510 may include network interface entries 512*a-n* for each of the network interfaces 106 capable of sending or receiving multicast messages on a computing device 102.

A network interface entry 512 may include information corresponding to a particular network interface 106. A network interface entry 512 may contain information about a socket 528 that is bound to the corresponding network interface 106. A network interface entry 512 may also contain the IP address 530 and subnet mask 532 of the corresponding network interface 106.

A network interface entry 512 may further contain a network interface type 534 of the corresponding network interface 106. For example, a network interface type 534 may be a wired interface, a wireless interface, a virtual private network (VPN) interface or another type of interface not mentioned. The network interface type 534 may be determined based on keywords in a network interface description that is available from operating system functions (e.g., Windows OS system functions).

In one configuration, the Windows OS system function "GetAdaptersAddresses" may be used to obtain the keywords (e.g., descriptions). Information stored in an OS registry (e.g., "SYSTEM\CurrentControlSe\\services\\cpip\\Parameters\\Interfaces\\") may also be used to obtain keywords. The keywords are configurable to be any phrase or part of a phrase. The computing device 102 may look for keywords (e.g., VPN, wireless, wired, etc.) to determine the network interface type 534. In one example, the keywords may include the case sensitive terms "VPN," "Vpn" and "vpn." The description received from GetAdaptersAddresses may be the string that is checked for keywords. Furthermore, a field returned from GetAdaptersAddresses may provide an IfType value that will indicate if a network interface type 534 is a wireless connection or not.

In the configuration illustrated in FIG. 5, the network interface list 510 includes network interface A entry 512*a* through network interface N entry 512*n*. The network interface A entry 512*a* includes the IP address 530*a*, subnet mask 532*a*, network interface type 534*a* and socket 528*a* corresponding to a network interface A 106. The network interface N entry 512*n* includes the IP address 530*n*, subnet mask 532*n*, network interface type 534*n* and socket 528*n* corresponding to a network interface N 106. It should be noted that while FIG. 5 depicts network interface entry A 512*a* through network interface entry N 512*n*, any number of network interface entries 512 may be included in the network interface list 510.

Figure 6:
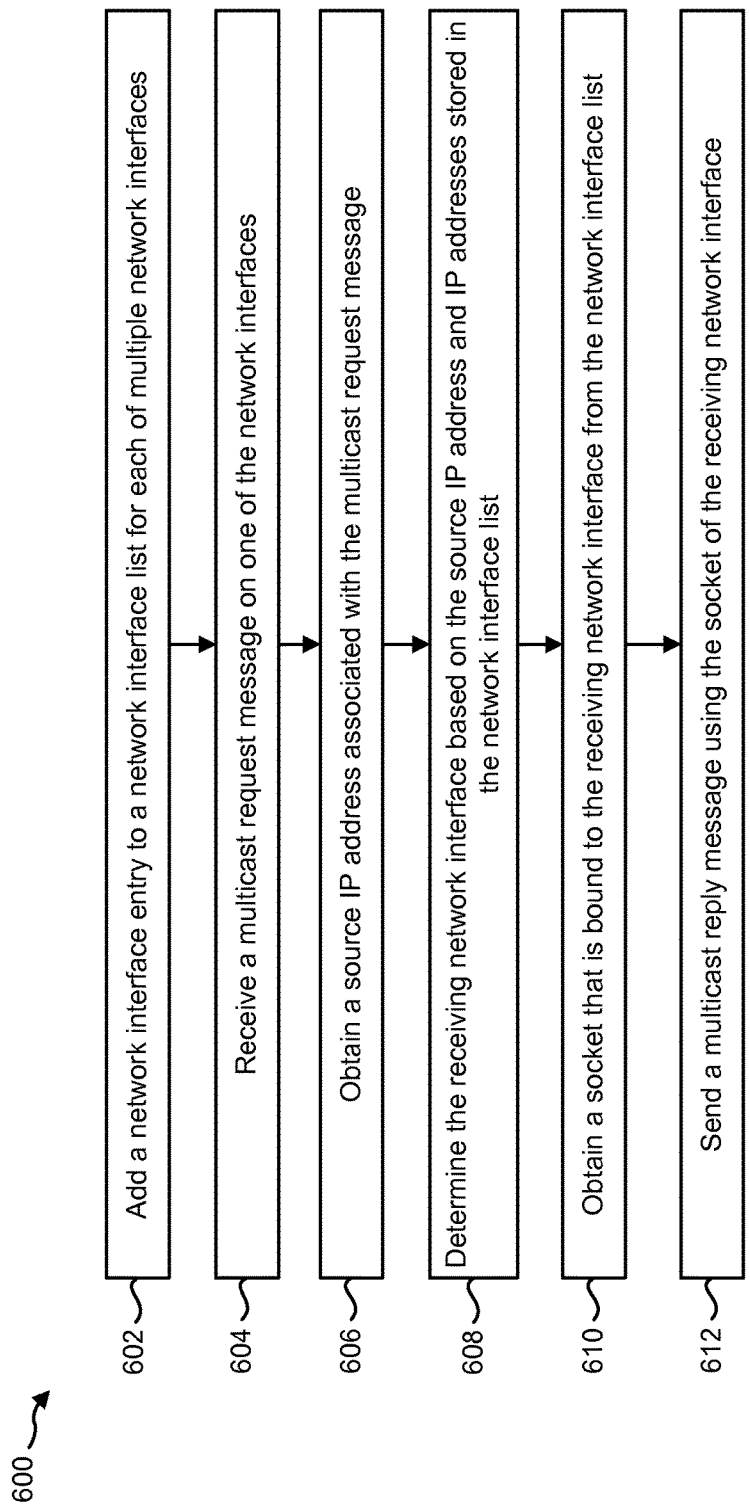
FIG. 6 is a flow diagram illustrating a detailed configuration of a method for multicast message routing.

FIG. 6 is a flow diagram illustrating a detailed configuration of a method 600 for multicast message routing. A computing device 102 may add 602 a network interface entry 112 to a network interface list 110 for each of multiple network interfaces 106. The computing device 102 may include two or more network interfaces 106. Each network interface 106 may be connected to a subnet 416. The network interfaces 106 may be connected to the same or different subnets 416. Each network interface 106 may have an IP address 430, subnet mask 532 and socket 428. A network interface entry 112 may include the IP address 430, subnet mask 532 and socket 428 of a particular network interface 106. A network interface entry 112 may also include the network interface type 534 (e.g., wired, wireless, VPN, etc.) of the network interface 106. The computing device 102 may periodically update the network interface list 110 to ensure that the network interface entries 112 are current.

The computing device 102 may receive 604 a multicast request message 420 on one of the network interfaces 106. The multicast request message 420 may request the transfer of a file 317 stored on the computing device 102. The multicast request message may be received 604 from another computing device 102 connected to a subnet 416.

The computing device 102 may obtain 606 a source IP address associated with the multicast request message 420. The multicast request message 420 may include the source IP address of the computing device 102 that sent the multicast request message 420.

The computing device 102 may determine 608 the receiving network interface 106 based on the source IP address and IP addresses stored in the network interface list 110. The IP addresses stored in the network interface list 110 may be included in the network interface entries 112. The computing device 102 may determine whether the IP address of a network interface entry 112 and the source IP address associated with the multicast request message 420 have the same network (or subnet) address using the subnet mask 532 of a network interface entry 112. An IP address may be represented by 4 bytes of information. The three first bytes of an IP address form a network portion of an IP address. This network portion may be referred to as the network address (or subnet address). The last byte may contain the Host Number or host portion of the IP address. In one example, the IP address of a network interface 106 may be 192.168.158.10 and the subnet mask is 255.255.255.0. In this case, the network portion is 192.168.158. and the host portion is 0.10.

The computing device 102 may check to see if the two IP addresses (e.g., a network interface IP address and the source IP address) have the same network (subnet) address. In one configuration, the computing device 102 may check to see if the first 3 bytes of the two IP addresses are the same. The computing device 102 may take an IP address bound to a network interface 106 and perform a bitwise OR operation with the negation (e.g., NOT operation) of the subnet mask 532 to mask off the bits. The computing device 102 may also take the source IP address and perform a bitwise OR operation with the negation (e.g., NOT operation) of the subnet mask 532. The computing device 102 may then compare the results to determine if they match. This operation is illustrated in Listing (1).

if((address|(~tmp.mask))=(tmp.addr|(~tmp.mask))). Listing (1)

In Listing (1), "address" is the IP address of the network interface 106, "|" is the bitwise OR operator, "~" is the NOT operator, "tmp.mask" is the subnet mask 532 and "tmp.addr" is the source IP address. In the case where the subnet mask is 255.255.255.0, the NOT operation results in 0.0.0.255. A bitwise OR operation between 192.168.158.10 and 0.0.0.255 results in 192.168.158.255. If the source IP address is 192.168.158.25, a bitwise OR operation with the negation (e.g., NOT operation) of the subnet mask 532 also results in 192.168.158.255. Because these numbers match, the source IP address and the IP address of the network interface 106 belong to the same subnet 416. If the network portion of the IP addresses were different, then the source IP address and the IP address of the network interface 106 would not be on the same subnet 416.

The computing device 102 may perform the operations illustrated in Listing (1) for each network interface entry 112 included in the network interface list 110. A network interface 106 that results in a match based on Listing (1) is determined 608 to be the receiving network interface 106.

The computing device 102 may obtain 610 a socket 428 that is bound to the receiving network interface 106 from the network interface list 110. The computing device 102 may send 612 a multicast reply message 426 using the socket 428 of the receiving network interface 106.

Figure 7:
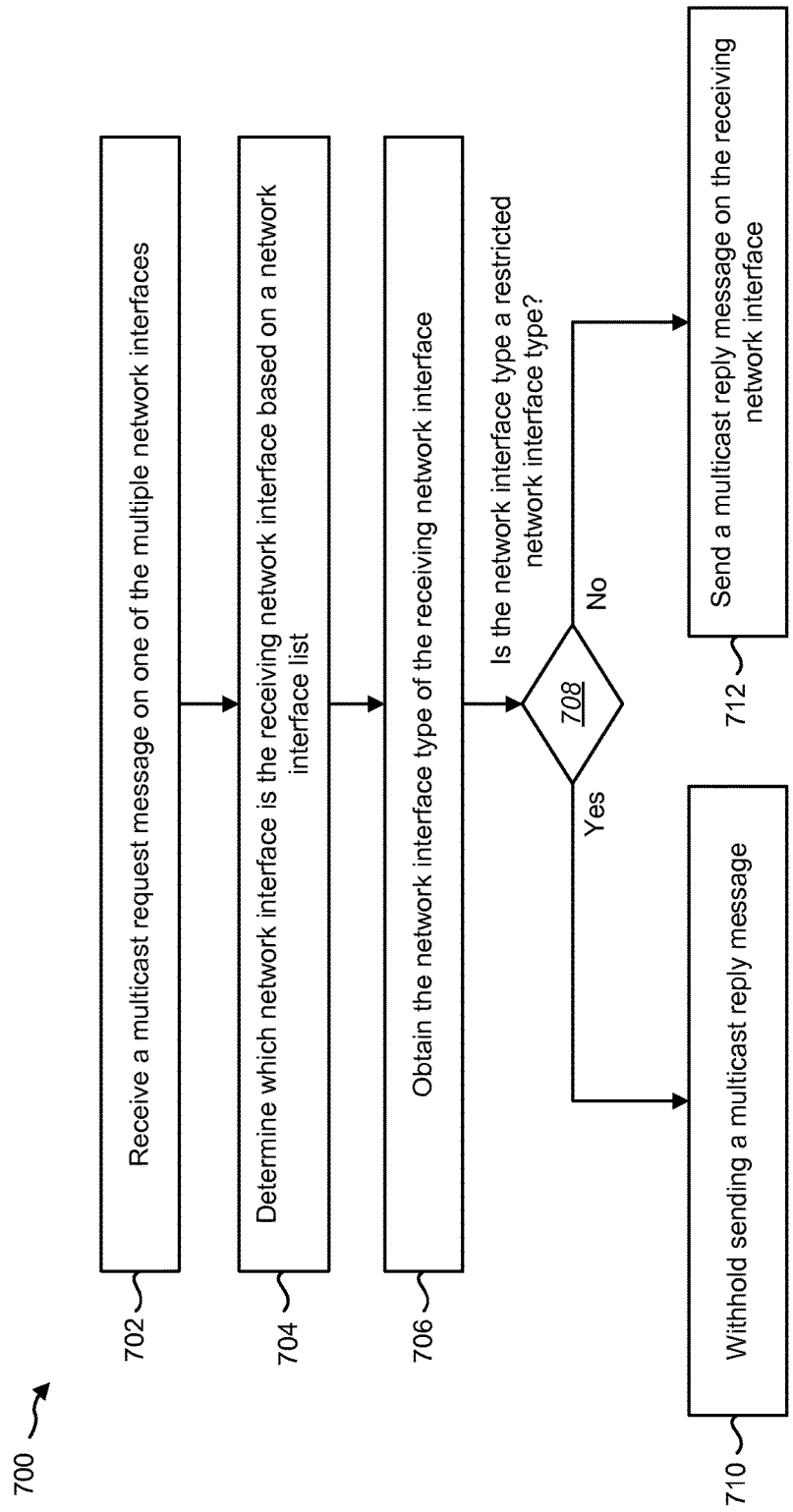
FIG. 7 is a flow diagram illustrating another detailed configuration of a method for multicast message routing.

FIG. 7 is a flow diagram illustrating another detailed configuration of a method 700 for multicast message routing. A computing device 102 may receive 702 a multicast request message 420 on one of multiple network interfaces 106. The multicast request message 420 may request the transfer of a file 317 stored on the computing device 102.

The computing device 102 may determine 704 which network interface 106 is the receiving network interface 106 based on a network interface list 110. This may be accomplished as described above in connection with FIG. 2.

The computing device 102 may obtain 706 the network interface type 534 of the receiving network interface 106. The network interface list 110 may include network interface entries 112 corresponding to multiple network interfaces 106 on the computing device 102. A network interface entry 112 may include the IP address 430, subnet mask 532, socket 428 and network interface type 534 of a corresponding network interface 106. The computing device 102 may look up (e.g., query) the network interface entry 112 corresponding to the receiving network interface 106 to obtain 706 the network interface type 534.

The computing device 102 may determine 708 whether the network interface type 534 is a restricted network interface type 113. The restricted network interface types 113 may be configured to include network interface types 534 that may be prevented from sending a multicast reply message 426. If a network interface 106 is a restricted network interface types 113, then multicast data may be blocked from being sent out of that network interface 106.

In one configuration the computing device 102 may determine 708 whether the network interface type 534 is a restricted network interface type 113 based on keywords. For example, the restricted network interface types 113 may include wireless interfaces and/or VPN interfaces. The computing device 102 may compare (using Boolean operations, for instance) the network interface type 534 of the receiving network interface 106 with the restricted network interface types 113. If the computing device 102 determines 708 that network interface type 534 is a restricted network interface type 113, then the computing device 102 may withhold 710 sending (e.g., block) a multicast reply message 426.

If the computing device 102 determines 708 that network interface type 534 is not a restricted network interface type 113, then the computing device 102 may send 712 a multicast reply message 426 on the receiving network interface 106. This may be accomplished as described above in connection with FIG. 2. For example, the computing device 102 may obtain the socket 428 of the receiving network interface 106 from the corresponding network interface entry 112. The computing device 102 may then send 712 the multicast reply message 426 using the socket 428 of the receiving network interface 106.

Figure 8:
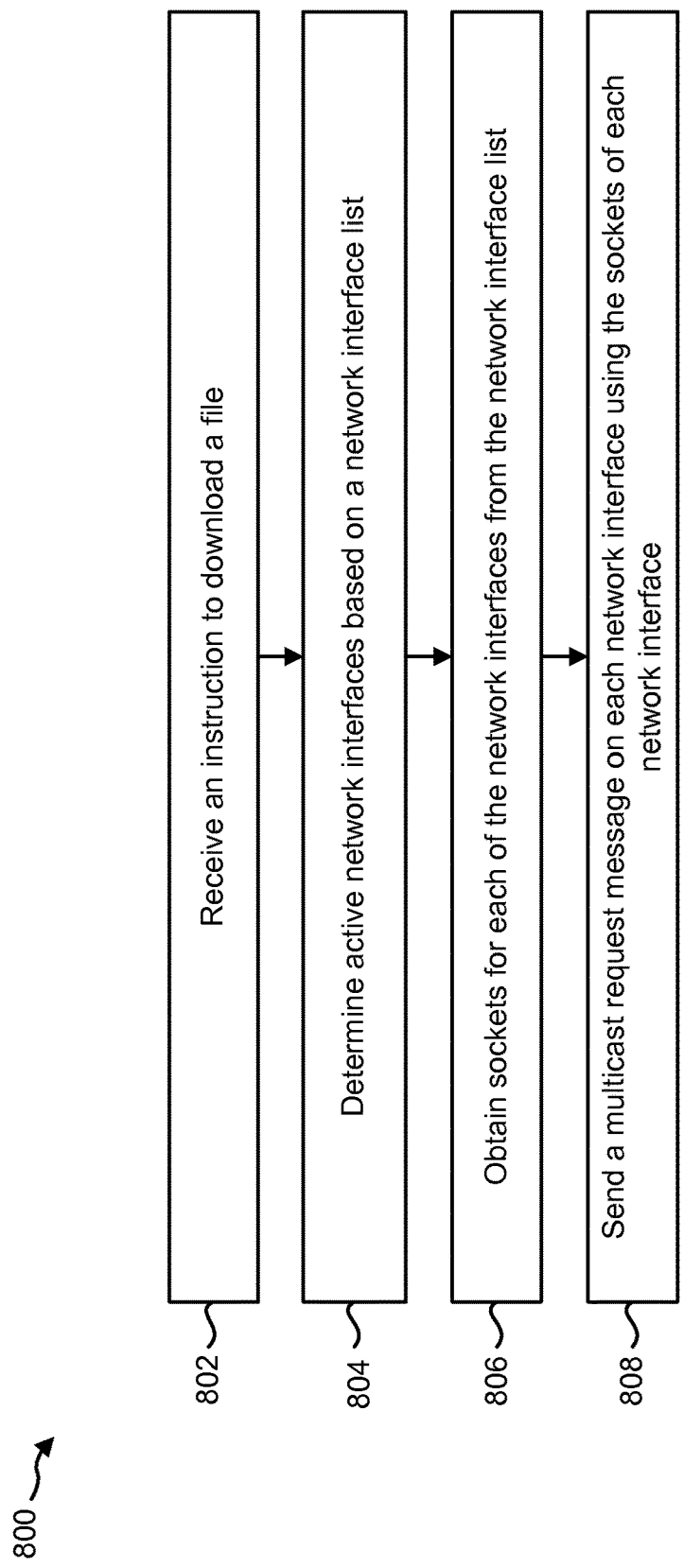
FIG. 8 is a flow diagram illustrating yet another detailed configuration of a method for multicast message routing.

FIG. 8 is a flow diagram illustrating yet another detailed configuration of a method 800 for multicast message routing. A computing device 102 may receive 802 an instruction to download a file 317. The computing device 102 may generate a multicast request message 420. The multicast request message 420 may indicate that the computing device 102 is seeking to download the file 317 from a peer.

The computing device 102 may determine 804 active network interfaces 106 based on a network interface list 110. The network interface list may include network interface entries 112 for each of the active network interfaces 106 as described above in connection with FIG. 5.

The computing device 102 may obtain 806 sockets 428 for each of the network interfaces 106 from the network interface list 110. The computing device 102 may send 808 the multicast request message 420 on each network interface 106 using the sockets 428 of each network interface 106. By sending 808 the multicast request message 420 out on each of the network interfaces 106, the computing device 102 may maximize the chances of finding a peer that has the requested file 317.

In another configuration, the computing device 102 may determine whether a network interface 106 is a restricted network interface type 113 before sending 808 the multicast request message 420. This may be accomplished as described above in connection with FIG. 7. If a network interface 106 is a restricted network interface type 113, then the computing device 102 may withhold sending the multicast request message 420 on that network interface 106. In one example, a restricted network interface type 113 includes a wireless and VPN interface. Therefore, if a network interface 106 is a wireless or VPN interface, the computing device 102 may withhold sending the multicast request message 420 on that network interface 106. However, if a network interface 106 is a wired interface (or other type of network interface 106), then the computing device 102 may send the multicast request message 420 on that network interface 106.

Figure 9:
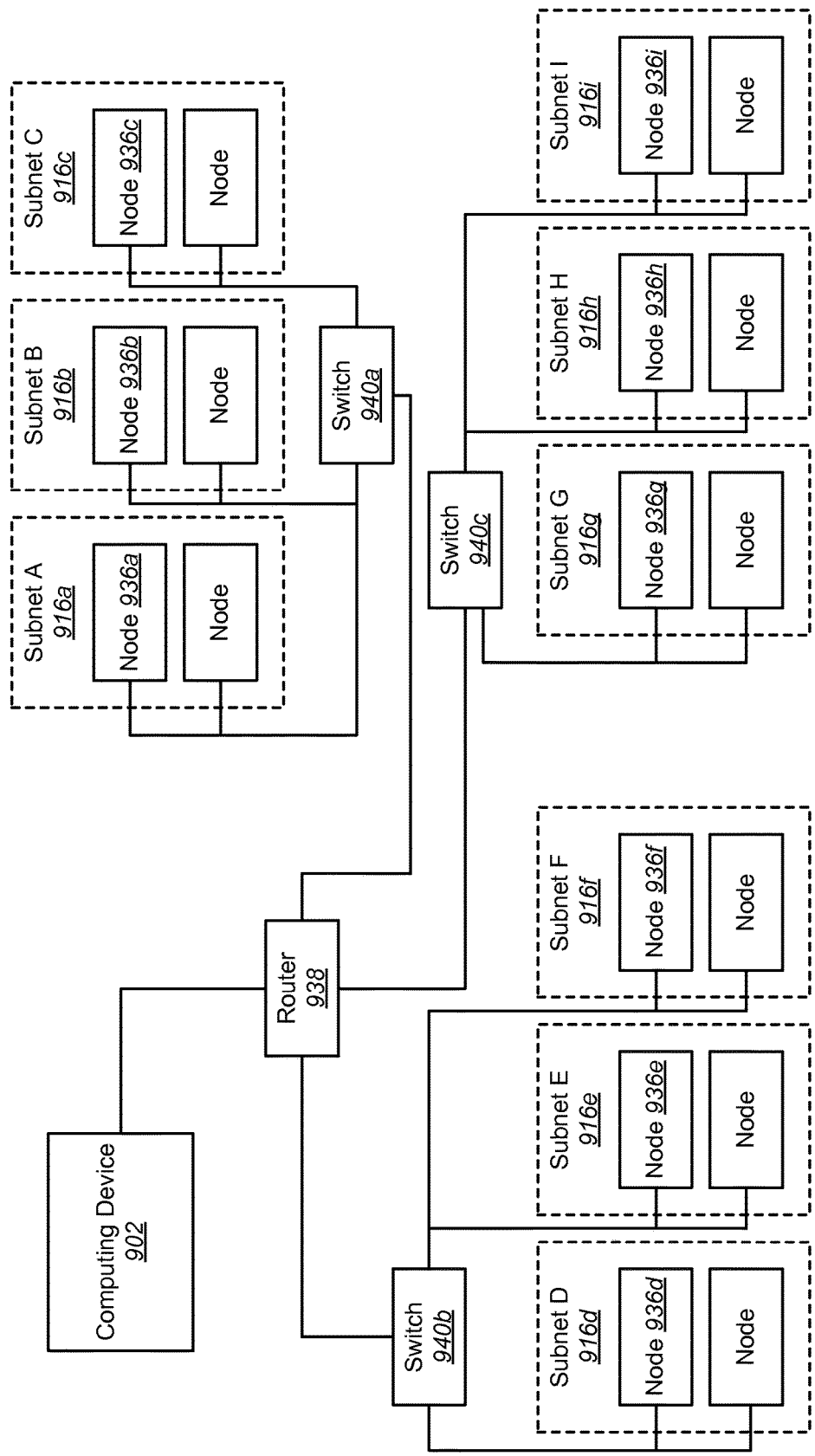
FIG. 9 is a block diagram that illustrates one configuration of a network where a system for multicast message routing may be implemented.

FIG. 9 is a block diagram that illustrates one configuration of a network where a system for multicast message routing may be implemented. A computing device 902 is connected to a router 938. The router 938 is connected to switches 940*a*, 940*b*, 940*c*. The switch 940*a* is connected to several nodes 936*a*, 936*b*, 936*c*, etc., via their respective subnets 916*a*, 916*b*, 916*c*. The switch 940*b* is connected to several nodes 936*d*, 936*e*, 936*f*, etc., via their respective subnets 916*d*, 916*e*, 916*f*. The switch 940*c* is connected to several nodes 936*g*, 936*h*, 936*i*, etc., via their respective subnets 916*g*, 916*h*, 916*i*. Although FIG. 9 only shows one router 938, and a limited number of switches 940, subnets 916 and nodes 936, many and varied numbers of routers 938, switches 940, subnets 916 and nodes 936 may be included in networks and/or systems where a system for multicast message routing may be implemented.

Figure 10:
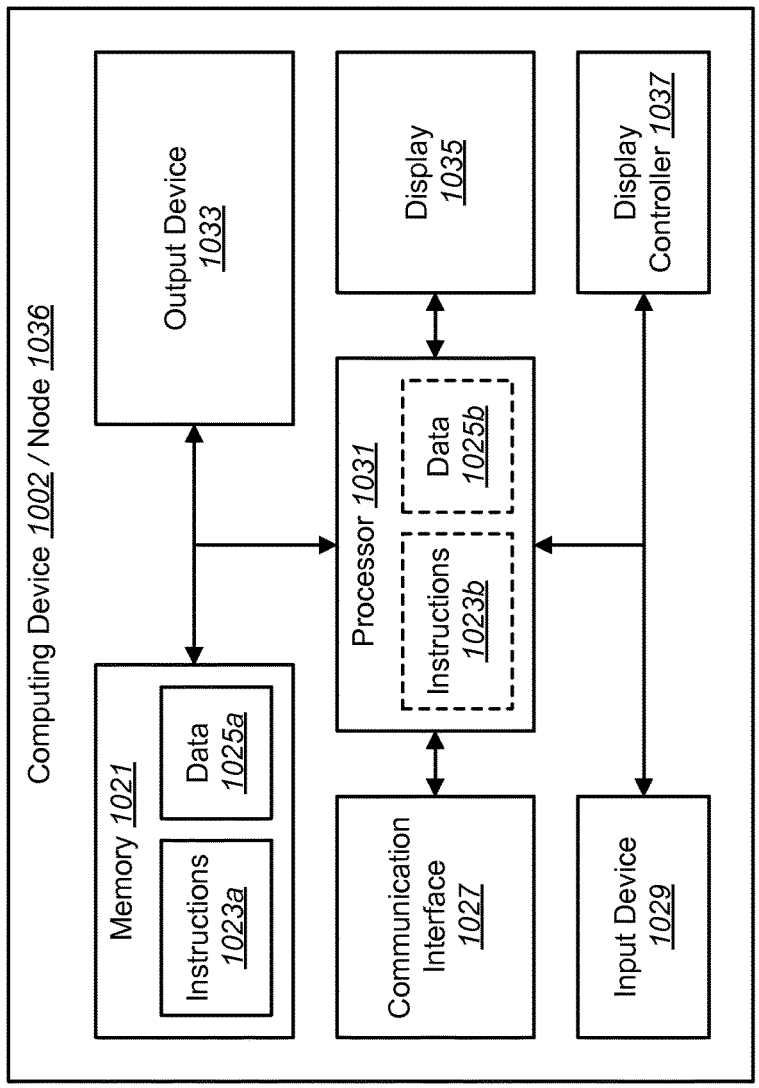
FIG. 10 illustrates various components that may be utilized on a computing device and/or a node.

FIG. 10 illustrates various components that may be utilized on a computing device 1002 and/or a node 1036. The illustrated components may be located within the same physical structure or in separate housings or structures.

The computing device 1002 and/or node 1036 may include a processor 1031 and memory 1021. The memory 1021 may include instructions 1023*a* and data 1025*a*. The processor 1031 controls the operation of the computing device 1002 and/or node 1036 and may be, for example, a microprocessor, a microcontroller, a digital signal processor (DSP) or other device known in the art. The processor 1031 typically performs logical and arithmetic operations based on program instructions 1023*b* and/or data 1025*b* it loads from the memory 1021.

The computing device 1002 and/or node 1036 typically may include one or more communication interfaces 1027 for communicating with other electronic devices. The communication interfaces 1027 may be based on wired communication technology, wireless communication technology, or both. Examples of different types of communication interfaces 1027 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 1002 and/or node 1036 typically may include one or more input devices 1029 and one or more output devices 1033. Examples of different kinds of input devices 1029 include a keyboard, mouse, microphone, remote control device, button, joystick, trackball, touchpad, lightpen, etc. Examples of different kinds of output devices 1033 include a speaker, printer, etc. One specific type of output device that may be typically included in a computer system is a display device 1035. Display devices 1035 used with configurations disclosed herein may utilize any suitable image projection technology, such as a cathode ray tube (CRT), liquid crystal display (LCD), light-emitting diode (LED), gas plasma, electroluminescence or the like. A display controller 1037 may also be provided, for converting data stored in the memory 1021 into text, graphics and/or moving images (as appropriate) shown on the display device 1035.

Of course, FIG. 10 illustrates only one possible configuration of a computing device 1002 and/or node 1036. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

It should be appreciated that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be non-transitory and tangible.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device that is configured for multicast message routing, comprising:
    a processor;
    a memory in electronic communication with the processor; and instructions stored in the memory, the instructions being executable to:
        receive, via multicast, a first multicast message on a network interface, the network interface connected to a subnet and being one of multiple network interfaces associated with the computing device, the first multicast message received from a device from a plurality of devices in the subnet;
        determine, based on a network interface list, which network interface from the multiple network interfaces associated with the computing device is the network interface that received the first multicast message, the network interface list including a network interface entry for each network interface from the multiple network interfaces, the network interface entry for each network interface from the multiple network interfaces including an internet protocol (IP) address and a subnet mask of that network interface, the determining including, for each network interface from the multiple network interfaces:
            identifying a network portion of a source IP address associated with the first multicast message using the subnet mask of the network interface entry for that network interface;
            identifying a network portion of the IP address of the network interface entry for that network interface using the subnet mask of the network interface entry for that network interface; and
            comparing the network portion of the source IP address to the network portion of the IP address of the network interface entry to determine whether that network interface is the network interface that received the first multicast message; and
        send, after executing the instruction to determine and via the network interface that received the first multicast message and not the other network interfaces from the multiple network interfaces, a second multicast message based on the first multicast message to the plurality of devices in the subnet.

2. The computing device of claim 1, wherein the network interface entry for each network interface from the multiple network interfaces comprises an identifier for a socket that is bound to that network interface.

3. The computing device of claim 2, wherein the instruction executable to send the second multicast message comprises an instruction executable to use the socket that is bound to the network interface.

4. The computing device of claim 1, wherein the network interface entry for each network interface from the multiple network interfaces comprises a network interface type for that network interface, the network interface type determined based on a network interface description provided by an operating system associated with that network interface.

5. The computing device of claim 4, wherein the network interface type in the network interface entry for each network interface from the multiple network interfaces is one of a wired interface, a wireless interface or a virtual private network (VPN) interface.

6. The computing device of claim 5, wherein the instruction executable to send the second multicast message comprises instructions executable to:
    determine the network interface type of the network interface; and
    send the second multicast message when the network interface type of the network interface is a wired interface.

7. The computing device of claim 1, wherein each network interface from the multiple network interfaces is connected to a different subnet.

8. A method for multicast message routing by a computing device, comprising:
    receiving, via a multicast channel, a first multicast message on a network interface, the network interface being one of multiple network interfaces associated with the computing device, each network interface from the multiple network interfaces connected to a different subnet;
    determining, based on a network interface list, which network interface from the multiple network interfaces associated with the computing device is the network interface that received the multicast message, the network interface list including a network interface entry for each network interface from the multiple network interfaces, the network interface entry for each network interface from the multiple network interfaces including an internet protocol (IP) address and a subnet mask of that network interface, the determining including, for each network interface from the multiple network interfaces:

identifying a network portion of a source IP address associated with the first multicast message using the subnet mask of the network interface entry for that network interface;

identifying a network portion of the IP address of the network interface entry for that network interface using the subnet mask of the network interface entry for that network interface; and comparing the network portion of the source IP address to the network portion of the IP address of the network interface entry to determine whether that network interface is the network interface that received the first multicast message; and sending, after the determining and via the network interface that received the first multicast message and not the other network interfaces from the multiple network interfaces, a second multicast message based on the first multicast message to the subnet connected to the network interface that received the first multicast message and not to subnets connected to the remaining network interfaces from the multiple network interfaces.

9. The method of claim 8, wherein the network interface entry for each network interface from the multiple network interfaces comprises an identifier of a socket that is bound to that network interface.

10. The method of claim 9, wherein sending the second multicast message further includes using the socket that is bound to the network interface.

11. The method of claim 8, wherein the network interface entry for each network interface from the multiple network interfaces further includes a network interface type for that network interface, the network interface type determined based on a network interface description provided by an operating system associated with that network interface.

12. The method of claim 11, wherein the network interface type in the network interface entry for each network interface from the multiple network interfaces is one of a wired interface, a wireless interface or a virtual private network (VPN) interface.

13. The method of claim 12, wherein sending the second multicast message includes:
determining the network interface type of the network interface; and
sending the second multicast message when the network interface type of the network interface is a wired interface.

14. A non-transitory tangible computer-readable medium to multicast message route on a computing device comprising executable instructions to:
receive, via a multicast channel, a first multicast message on a network interface, the network interface being one of multiple network interfaces associated with the computing device, each network interface from the multiple network interfaces connected to a different subnet from a plurality of subnets, the first multicast message received from a device in the subnet from the plurality of subnets connected to the network interface that received the first multicast message, a network interface list including a network interface entry for each network interface from the multiple network interfaces;

for each network interface entry from a set of network interface entries in the network interface list:
identify a network portion of a source internet protocol (IP) address associated with the first multicast message using a subnet mask of that network interface entry, the network interface entry for each network interface from the multiple network interfaces includes an IP address and a subnet mask of the network interface for that network interface entry;
identify a network portion of the IP address of that network interface entry using the subnet mask of that network interface entry; and
compare the network portion of the source IP address to the network portion of the IP address of that network interface entry to identify the network interface that received the first multicast message; and send, after executing the instruction to compare and based on the first multicast message, a second multicast message directly to the subnet including the device that sent the first multicast message via the network interface that received the first multicast message and not the other network interfaces from the set of network interfaces.

15. The computing device of claim 1, wherein the computing device is a peer computing device, the first multicast message being a request by the peer computing device to receive a file from one or more other peer computing devices from the plurality of devices in the subnet.

16. The computing device of claim 1, wherein the computing device is a peer computing device, the first multicast message being a request by the peer computing device to receive a file from one or more other peer computing devices from the plurality of devices in the subnet,
the second multicast message indicating that the peer computing device is requesting the file.

17. The computing device of claim 1, wherein the network interface is a first network interface, the instructions further executable to update the network interface list based on an event associated with a second network interface from the multiple network interfaces having a network interface entry in the network interface list, the event being one of: an activation of the second network interface, or a deactivation of the second network interface.

* * * * *